Jan. 14, 1947.

N. BREWER 2,414,086

FLUID METER

Filed Nov. 25, 1943

INVENTOR.
Nathaniel Brewer
BY Leonard L. Kalish
ATTORNEY.

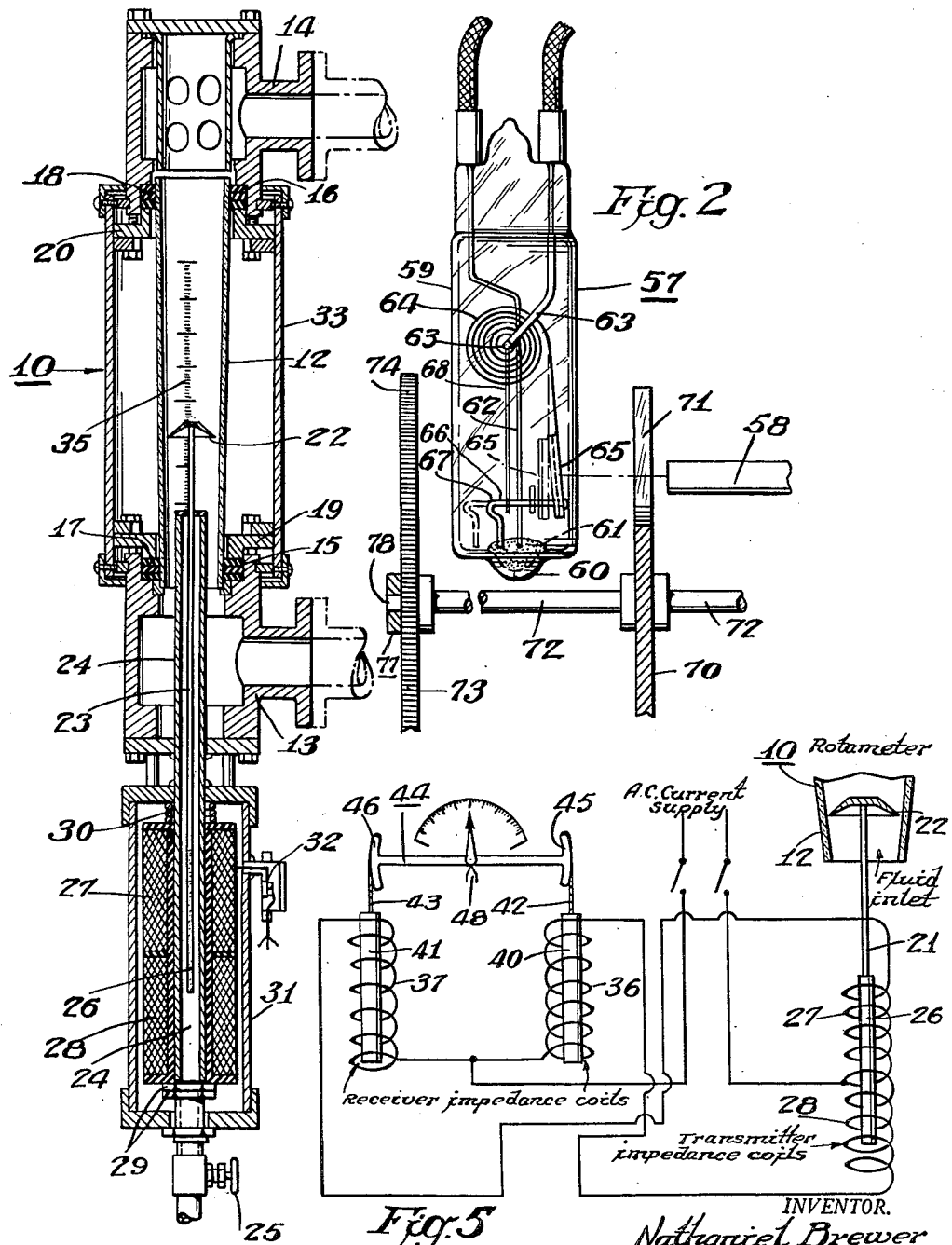

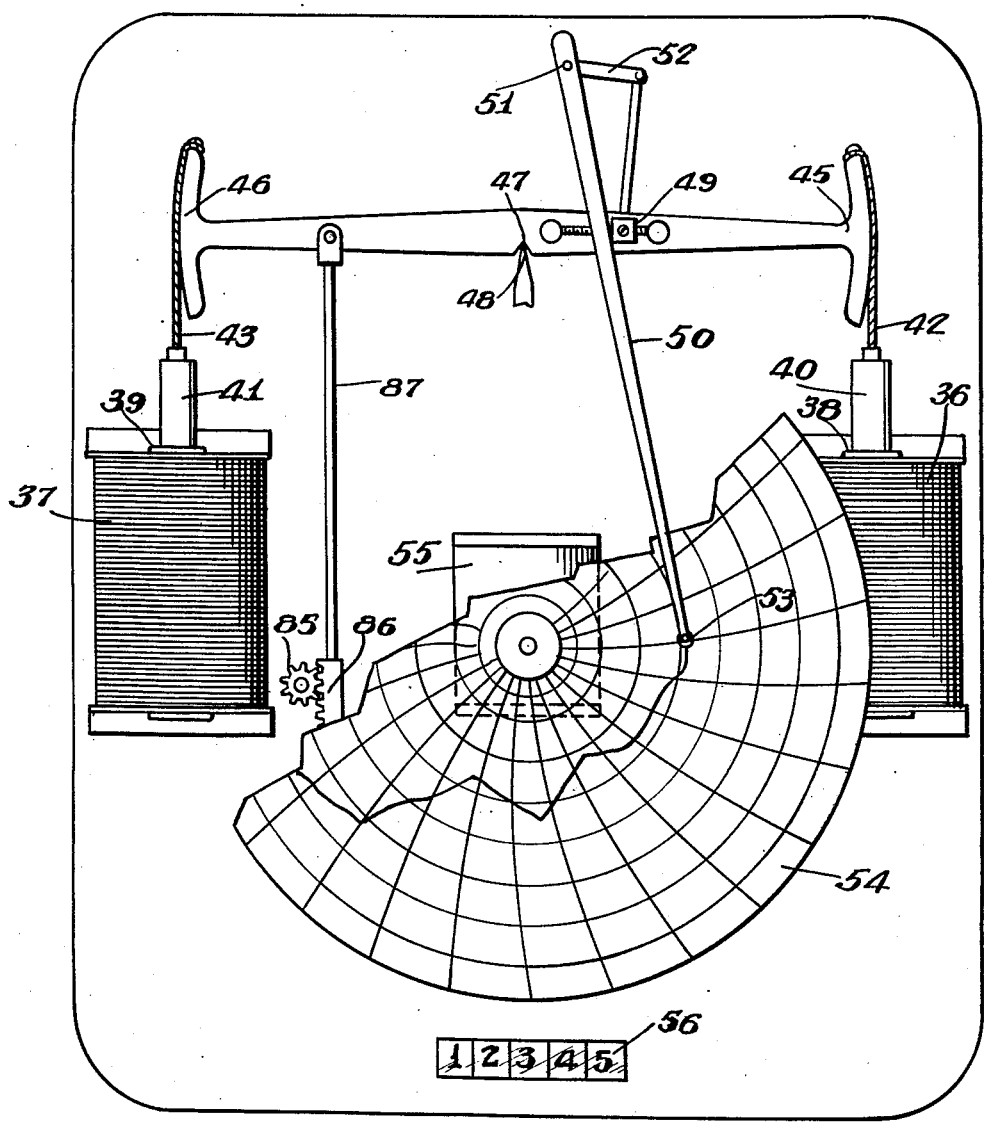

UNITED STATES PATENT OFFICE 2,414,086

FLUID METER

Nathaniel Brewer, Hatfield, Pa., assignor to Fischer & Porter Company, Hatboro, Pa., a corporation of Pennsylvania Application November 25, 1943, Serial No. 511,649

9 Claims. (Cl. 73—209)

The present invention relates to meters responsive to variations in a variable condition and it relates more particularly to meters for remote indication, recording and integration of a variable condition, such as, for example, fluid flow.

An object of the present invention is to provide means for accurate remote indication, recording and integration of rate-of-flow of a fluid.

Other objects and advantages of the present invention are apparent in the following detailed description, appended claims and accompanying drawings.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 2 represents a view, on an enlarged scale, showing the magnetic switch mechanism of the embodiment of Figure 1.

Figure 3 represents a vertical cross-sectional view of the rotameter indicating and transmitting unit of the present invention.

Figure 4 represents an elevational view of the impedance bridge receiving unit of the present invention, parts being broken away better to reveal the construction thereof.

Figure 5 represents a wiring diagram illustrating the manner of connecting the transmitting and receiving coils of the impedance bridge.

Figure 1:
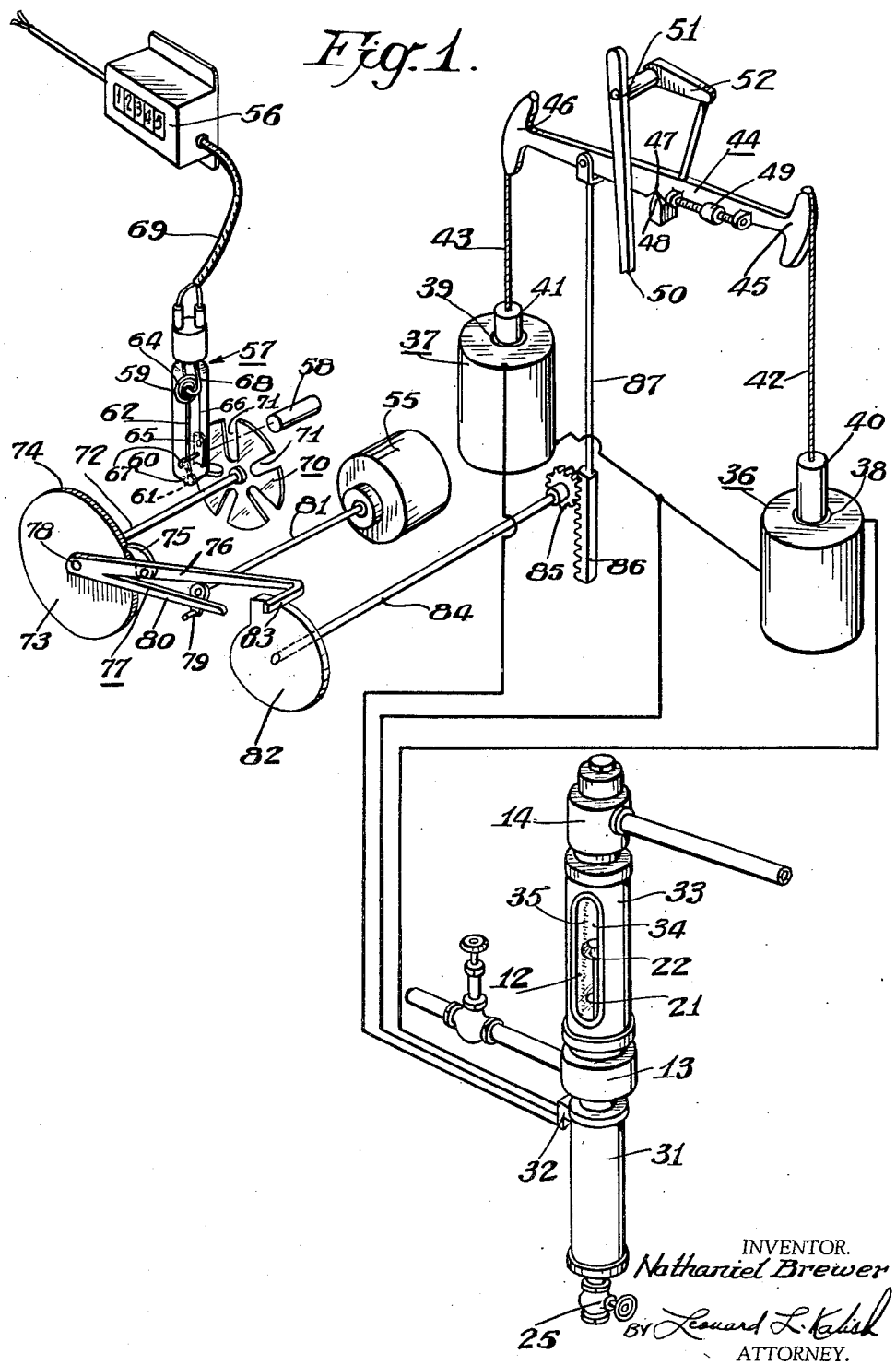
Figure 1 represents a schematic view of one embodiment of the present invention.

In the embodiment shown in the drawings, a rotameter, indicated generally by the reference character 10, is adapted to indicate rate-of-flow of fluid through a pipe-line or the like and is also adapted electrically to transmit the rate-of-flow to a remote receiving unit shown in Figure 4 which is adapted continuously to record the rate-of-flow and also to indicate total flow of fluid passing through the rotameter during a predetermined period of time.

The rotameter 10, as shown in Figure 3, includes a vertical downwardly tapered transparent metering tube 12, a lower inlet fitting 13 adapted for connection to an inlet pipe-line or the like and an upper outlet fitting 14 adapted for connection to an outlet pipe-line or the like, the ends of the metering tube 12 being held in fluid-tight sealing relationship with stuffing boxes 15 and 16 of said fittings 13 and 14 respectively, by means of lower and upper packing rings 17 and 18 and lower and upper adjustable stuffing glands 19 and 20 respectively.

A metering float 21 includes an uppermost conical flow-constricting head portion 22 adapted for free up-and-down movement within said metering tube 12 and an elongated closed tube 23 extending downwardly from said head portion 22.

A well 24 of suitable corrosion-resistant non-magnetic material extends downwardly from the lower end of the metering tube 12 and through the inlet fitting 13, a drain valve 25 being provided in the lower end of the well 24.

The well 24 is open at its upper end, so that it is, at all times, filled with the fluid being metered. The extension tube 23 of the metering float 21 extends downwardly within the well 24, the tube 23 carrying a soft iron armature 26 within its lower end.

Outside the well 24 and around it are wrapped upper and lower sets of balanced impedance transmitter coils 27 and 28.

The position of the impedance coils 27 and 28 may be vertically varied by means of lowermost screw-threaded adjusting nuts 29 working against the uppermost coil spring 30.

A case 31 surrounds the impedance coils 27 and 28 and is provided with a box 32 from which the lead wires to the coils emerge.

An outer removable casing 33 having a window 34 therein surrounds the metering tube 12, a scale 35 being positioned alongside the tube 12 whereby the position of the metering float may be read off against the calibrations on the scale.

The impedance transmitter coils 27 and 28 are electrically connected to a pair of balanced impedance receiver coils 36 and 37 as shown in the wiring diagram of Figure 5.

The laterally-disposed receiver coils 36 and 37 are identical in construction, the coils being wound about cores 38 and 39 which are hard glass tubes having mirror-smooth cylindrical inner bores of extreme accuracy.

Soft iron armatures 40 and 41 are disposed for free up-and-down movement within the cores 38 and 39 respectively, the armatures 40 and 41 being supported from opposite ends of a balance beam 44 by flexible cords 42 and 43 respectively.

The ends of the beam 44 are formed as vertical arc segments 45 and 46, the cords 42 and 43 being connected to the tops of the segments 45 and 46 and extending downwardly over the segments so that the armatures 40 and 41 always hang in the same vertical lines, there being no lateral movement of the armatures with tilting of the balance beam 44.

The balance beam 44 is provided with an inverted V-groove 47 which rests upon knife edges 48 to permit tilting of the beam. The beam 44 is provided with an adjustable weight 49 for balancing the beam.

A pen arm 50 is pivoted as at 51 and is connected to the beam 44 by suitable linkage 52 whereby the pen arm 50 will be moved upon tilting of the beam 44, a pen 53 on said arm 50 being adapted to record said movement upon a chart 54 which is rotated by a synchronous electric motor 55.

The operation of the present invention in recording rate-of-flow of fluid will now be described.

When there is no upward flow of fluid through the metering tube 12, the metering float 21, being somewhat greater in specific gravity than the fluid being metered, remains in its lowermost position. As rate-of-flow increases, the float rises within the metering tube 12, the height of the float indicating rate-of-flow in a manner well known in the art.

Movement of the metering float 21 responsive to changes in rate-of-flow causes corresponding changes in the position of the armature 26 relative to the impedance transmitter coils 27 and 28; the higher the metering float, the greater is the proportion of the armature 26 within the upper impedance coil 27 and correspondingly less is the proportion of the armature 26 within the lower impedance coil 28. As is well known in the art, the impedance of the upper coil 27 is thus increased while the impedance of the lower coil 28 is correspondingly decreased.

In the balanced electrical circuit shown in Figure 5 this variation in impedance will vary the current in the receiver coils 36 and 37 and will tend to move the armatures 40 and 41 to corresponding positions within their respective coils. That is, as the armature 26 moves upward relative to the transmitter coils 27 and 28, the greater impedance of the upper transmitter coil 27 decreases the current in the left hand receiver coil 37, while the lesser impedance of the lower transmitter coil 28 increases the current in the right hand receiver coil 36. In this way, upward movement of the armature 26 will cause a downward movement of the armature 40 and an upward movement of the armature 41 to result in a clockwise tilting of the balance beam 44. Similarly, downward movement of the armature 26 will result in a counterclockwise tilting of the balance beam 44.

It is apparent, therefore, that movements of the metering float 21 responsive to variations in rate-of-flow will be duplicated by movements of the pen 53 upon the rotating chart 54 to give a continuous record of the rate-of-flow.

The use of hard glass cores 38 and 39 for the coils 36 and 37 affords distinct advantages over conventional constructions.

Thus, it is well known that, in an impedance coil, the armature is pulled up against the side of the core by the magnetic field so that a certain amount of friction results which, in conventional constructions, constitutes a serious factor in determining the sensitivity and accuracy of the unit. The use of glass cores having extremely hard and smoothly accurate cylindrical inner bores reduces this friction and resulting error to a minimum.

Furthermore, the use of glass cores together with the vertical arc segments 45 and 46 on the balance beam 44 (the vertical arc segments 45 and 46 maintaining the armatures 40 and 41 at the same vertical line regardless of tilting of the beam 44) permits the use of smaller diameter cores which, in turn, allows more windings to be placed upon a core of a given axial length. This increase in the number of windings possible increases the strength of the magnetic field created by the coils and thus increases the sensitivity of the impedance bridge.

The balance beam construction of the present invention has a further advantage over conventional constructions in that the use of inverted V-grooves 47 on the beam 44 resting upon knife edges 48 on the beam support protects the knife edge from dust or other foreign matter which would cause deterioration or loss of sensitivity (as distinguished from conventional beam constructions in which exposed knife edges are carried by the beam and are supported from underneath).

The mechanism thus far described has for its purpose the remote indication and recording of the rate-of-flow of fluid passing through the rotameter 10. The present invention also includes means for integrating the fluid flow so as to register the total amount of fluid which has passed through the rotameter 10 during any elapsed period of time.

This mechanism, which is shown particularly in Figures 1 and 2, includes a conventional electrical counter 56 which is adapted to make one numerical count in the unit digit column with each break of the electrical circuit following a make of the circuit; the period of time during which the circuit remains open or closed being immaterial.

The make and break of the circuit is accomplished by means of a magnetically-actuated mercury switch 57 which is operated by a permanent bar magnet 58 in a manner to be hereinafter described.

The mercury switch 57, as shown particularly in Figure 2, includes a sealed glass body 59 having a small lowermost well 60 which contains a bead of mercury 61. A fixed electrode 62 extends downwardly from the top of the body 59 and into the mercury bead 61.

An arm 63 is mounted at the top of the body 59 and supports one end of a spiral hair spring 64, the other end of which extends downwardly and terminates in a plate or flag 65 of iron or the like which is sensitive to magnetism. Extending generally horizontally from the lower edge of the flag 65 is a wire 66 the other end of which terminates in a generally vertically extending movable electrode 67. The horizontal wire 66 is supported intermediate its ends by a looped rod 68 descending from the arm 63.

In its normal position the mercury switch 57 is open; the movable electrode 67 being held clear of the mercury bead 61 as shown in dotted lines in Figure 2. When, however, either pole of the bar magnet 58 is brought adjacent the right hand side of the mercury switch 57, the magnetic attraction will move the flag 65 to the right against the tension of the hair spring 64 until the switch assumes its closed position, shown in solid lines in Figure 2, in which the movable electrode 67 enters the mercury bead 61. So long as the magnetic field from the magnet 58 is uninterrupted the mercury switch 57 will remain closed; the upper end of the fixed electrode 62 and the upper end of the arm 63 (which is in electrical connection with the movable electrode 67 through the spring 64, the flag 65 and the wire 66) passing through the body 59 of the mercury switch and connecting with a cable 69 leading to the counter 56.

Immediately upon interruption of the magnetic field from the magnet 58, the movable electrode 67 will be moved to its open position by the spring 64 to break the electrical circuit and to operate the counter 56.

An interruptor wheel 70, which is of steel or other magnetic material, is positioned intermediate the bar magnet 58 and the mercury switch 57. The interruptor wheel 70 is provided with a plurality of radial slots 71 whose function will be hereinafter described. The interruptor wheel is keyed to a rotatable shaft 72, the shaft 72 having a totalizer wheel 73 keyed to its other end.

The totalizer wheel has a hardened knurled periphery 74 which is adapted to be engaged upon upward movement of a pawl 75 mounted upon one arm 76 of a V-shaped actuator 77 which is loosely pivoted to the shaft 72 as at 78. The actuator 77 is swept upward at regular intervals by an eccentric crank 79 bearing against the other arm 80 of said actuator 77, the eccentric crank being driven by the synchronous motor 55 through a shaft 81.

While the uppermost limit of travel of the actuator 77 is fixed, its lowermost or starting position is variable and is governed by the position of a calibration cam 82. That is, the actuator 77 is supported in its lowermost position by a pin 83 carried at the outer end of the arm 76 and resting upon the periphery of the calibration cam 82.

During upward movement of the eccentric crank 79, the actuator 77 is moved upwardly and the knurled periphery 74 of the totalizer wheel 73 is engaged by the pawl 75 to rotate the totalizer wheel counterclockwise as in Figure 1. During downward movement of the eccentric crank 79, following each upward sweep, the pawl 75 is disengaged from the knurled periphery 74 so that the totalizer wheel 73 does not rotate, the actuator 77 descending until the pin 83 strikes the periphery of the calibration cam 82.

It can be seen that the pin 83 will prevent the actuator 77 from following the eccentric crank to the bottom of the latter's travel and, therefore, the upward movement of the actuator 77 on the next succeeding stroke will not begin until the eccentric crank 79 has moved upwardly sufficiently to again contact the arm 80 and to lift the pin 83 from the periphery of the calibration cam 82.

It is obvious, therefore, that the extent of travel of the actuator 77, and consequently the extent of rotation of the totalizer wheel 73, is dependent upon the starting point of the pin 83 as determined by the position of the calibration wheel 82. That is, if the calibration cam 82 is in the position shown in Figure 1, the pin 83 will be supported at a relatively high resting position so that the actuator 77 will be engaged much after starting of upward movement of the eccentric crank 79 so as to give a relatively small movement of the actuator 77 and a relatively small angle of rotation of the totalizer wheel 73. If, on the other hand, the calibration cam were rotated counterclockwise from the position shown in Figure 1 it is apparent that the starting position of the pin 83 would be moved downwardly to give a correspondingly greater movement of the actuator 77 and a correspondingly greater rotation of the totalizer wheel 73.

The calibration cam 82 is mounted upon a shaft 84, the other end of which carries a pinion gear 85 which is in engagement with a rack 86, the rack 86 being connected to the beam 44 by means of an arm 87 so that tilting of the beam 44 causes rotation of the pinion 85 and of the calibration cam 82. This connection is so effected that clockwise tilting of the beam 44 upon increase in rate-of-flow produces a counterclockwise rotation of the calibration cam 82 and vice versa.

The shape of the calibration cam is the same as the calibration curve of the rotameter as plotted on polar coordinates, so that the length of the upsweep of the pen 83 and the extent of the upward movement of the actuator 77 bear the same proportion to the maximum upsweep and extent of movement as the instantaneous rate-of-flow reading bears to the maximum rate-of-flow reading. Accordingly, the rate of rotation (R. P. M.) of the totalizer wheel 73 and of the interruptor wheel 70 bears the same relation to the maximum rate of rotation as the instantaneous rate-of-flow reading bears to the maximum rate-of-flow reading.

It is apparent that, as the interruptor wheel 70 is rotated, the magnetic field of the magnet 58 is intermittently interrupted. That is, whenever an unslotted portion of the wheel 70 is intermediate the magnet 58 and the mercury switch 57, the metal of the wheel will deflect the magnetic field from the switch so that the switch remains open. When, on the other hand, one of the slots 71 of the wheel 70 comes in line with the magnet 58 and the switch 57, the magnetic field of the magnet is free to actuate the switch and to close the electrical circuit.

From the foregoing explanation, it is apparent that the mercury switch 57 will automatically close the moment after the leading edge of each slot comes in alignment with the switch and the magnet and will remain closed as long as the slot 71 remains in such alignment and that, as soon as the leading edge of each unslotted segment of the wheel 70 comes intermediate the magnet and the mercury switch, the switch will automatically open to register one numerical count on the counter 56. Thus, the number of counts registered on the counter 56 will be equal to the rate of rotation of the interruptor wheel 70 multiplied by the number of slots or segments on the wheel.

It follows, therefore, that the number of counts bears the same proportion to the maximum number of counts as the given rate-of-flow reading bears to the maximum rate-of-flow reading of the rotameter.

Since the total flow (figured as gallons or pounds or any other convenient unit) passing through the rotameter during any elapsed period of time at the maximum rate-of-flow can readily be determined, it is a simple matter to calculate the total flow actually passing through the rotameter during the same period of time by multiplying the maximum rate of flow by an integrator factor; the integrator factor being the ratio of actual counts to maximum counts for the elapsed period.

By way of illustration, if it is known that, at maximum rate-of-flow, 500 gallons of fluid will pass through the rotameter in one hour and that the total number of counts at such maximum rate-of-flow is 320, and if it is found in actual operation that only 160 counts were registered during the hour, it is apparent that the total flow which actually passed through the rotameter during that hour was 250 gallons. Similarly, an actual count of 80 would indicate a total flow of 125 gallons, while an actual count of 288 would indicate a total flow of 450 gallons.

The integrating mechanism of the present invention has several distinct advantages over totalizers heretofore employed. Thus, for example, the counting is done without imposing any appreciable load whatever upon the metering float. Furthermore, since the totalizer "feels out" the instantaneous rate of flow several times a minute (for example, the totalizer can be set to make four sweeps per minute), the mechanism adjusts its rate of counting with sufficient frequency to ensure high accuracy.

Another advantage of the integrator of the present invention is that it permits the use of 2 or more electrical counters at any convenient location by simply connecting them in parallel with the mercury circuit.

Furthermore, electrical ticket- or tape-printing counters of conventional construction can be used in place of, or in addition to the counter described hereinabove.

As shown particularly in Figures 1 and 3, the remote rate-of-flow recorder and the integrator can be combined in a single unit for convenient reading.

While, for purposes of illustration, the integrator mechanism of the present invention has been described in connection with measurement of fluid flow wherein it constitutes a preferred embodiment, it is apparent that the integrator mechanism could be used equally well in connection with measurement of other variable conditions, such as temperature, pressure, etc. That is, it is apparent that the calibration cam could be rotated by the action of elements sensitive to variations in other conditions. For example, the calibration cam could be rotated by a temperature- or pressure-sensitive element such as a Bourdon tube.

The integrator of the present invention could also be used, for example to integrate, into total miles covered, the readings of a speedometer indicating miles per hour. Again, it could be used to integrate, into total pounds carried, the readings of a continuous weigher measuring pounds per minute carried by a belt conveyor or the like.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what I claim as new and desire to protect by Letters Patent is:

1. In a system for remote indication of fluid rate-of-flow having a rotameter including a vertical metering tube and a float adapted for free up-and-down movement responsive to variations in rate-of-flow of fluid through said tube and having indicating means remote from said rotameter; an extension tube disposed in axial alignment with said metering tube, an elongated member extending from said metering float into said extension tube, a balanced beam connected to said indicating means, and means for tilting said beam responsive to movements of said float, said last-mentioned means comprising an alternating current impedance circuit including a pair of end-to-end co-axial transmitter coils disposed about said extension tube, an armature carried by said elongated member and adapted to be moved within said transmitter coils by said float, a pair of generally vertical laterally-disposed parallel cylindrical receiver coils, and a pair of armatures carried by said beam and extending within said receiver coils and adapted to be pulled thereby so as to exert opposite moments upon said beam, the relative impedance of said transmitter coils being varied upon movement of the float-carried armature thereby to vary the current flowing in the respective receiver coils so as to vary the pull on the respective beam armatures and thus to tilt said beam.

2. In a system for remote indication of fluid rate-of-flow having a rotameter including a vertical metering tube and a float adapted for free up-and-down movement responsive to variations in rate-of-flow of fluid through said tube and having indicating means remote from said rotameter; an extension tube disposed in axial alignment with said metering tube, an elongated member extending from said metering float into said extension tube, a balanced beam connected to said indicating means, and means for tilting said beam responsive to movements of said float, said last-mentioned means comprising an alternating current impedance circuit including a pair of end-to-end co-axial transmitter coils disposed about said extension tube, an armature carried by said elongated member and adapted to be moved within said transmitter coils by said float, a pair of generally vertical laterally-disposed parallel cylindrical receiver coils, and a pair of armatures carried by said beam and extending within said receiver coils and adapted to be pulled thereby so as to exert opposite moments upon said beam, the relative impedance of said transmitter coils being varied upon movement of the float-carried armature thereby to vary the current flowing in the respective receiver coils so as to vary the pull on the respective beam armatures and thus to tilt said beam, said receiver coils being provided with cores of hard glass tubing having an extremely smooth and accurate cylindrical inner bore whereby the beam-armatures will move within said receiver coils with very little friction.

3. In a system for remote indication of fluid rate-of-flow having a rotameter including a vertical metering tube and a float adapted for free up-and-down movement responsive to variations in rate-of-flow of fluid through said tube and having indicating means remote from said rotameter; an extension tube disposed in axial alignment with said metering tube, an elongated member extending from said metering float into said extension tube, a balanced beam connected to said indicating means, and means for tilting said beam responsive to movement of said float, said last-mentioned means comprising an alternating current impedance circuit including a pair of end-to-end co-axial transmitter coils disposed about said extension tube, an armature carried by said elongated member and adapted to be moved within said transmitter coils by said float, a pair of generally vertical laterally-disposed parallel cylindrical receiver coils, and a pair of armatures carried by said beam and extending within said receiver coils and adapted to be pulled thereby so as to exert opposite moments upon said beam, the relative impedance of said transmitter coils being varied upon movement of the float-carried armature thereby to vary the current flowing in the respective receiver coils so as to vary the pull on the respective beam armatures and thus to tilt said beam, said beam having means at its opposite ends for supporting said armatures generally in the same vertical lines regardless of tilting of said beam.

4. In a system for remote indication and integration of fluid rate-of-flow having a rotameter including a vertical metering tube and a float adapted for free up-and-down movement responsive to variations in rate-of-flow of fluid through said tube, and having indicating means remote from said rotameter, and electrical counting means; an extension tube disposed in axial alignment with said metering tube, an elongated member extending from said metering float into said extension tube, a balanced beam connected to said indicating means, means for tilting said beam responsive to movements of said float, said last-mentioned comprising an alternating current impedance circuit including a pair of end-to-end co-axial transmitter coils disposed about said extension tube, an armature carried by said elongated member and adapted to be moved within said transmitter coils by said float, a pair of generally vertical laterally-disposed receiver coils, and a pair of armatures carried by said beam and extending within said receiver coils and adapted to be pulled thereby so as to exert opposite moments upon said beam, the relative impedance of said transmitter coils being varied upon movement of the float-carried armature thereby to vary the current flowing in the respective receiver coils so as to vary the pull on the respective beam armatures and thus to tilt said beam, and means connected to said beam for varying the rate of counting of said counting means responsive to variations in the rate-of-flow of fluid.

5. In a system for remote indication and integration of fluid rate-of-flow having a rotameter including a vertical metering tube and a float adapted for free up-and-down movement responsive to variations in rate-of-flow of fluid through said tube, and having indicating means remote from said rotameter, and electrical counting means; a balanced beam connected to said indicating means, means for tilting said beam responsive to movements of said float, said last-mentioned means comprising an alternating current impedance circuit including a pair of end-to-end transmitter coils co-axial with said metering tube, an armature carried by said float and adapted to be moved within said transmitter coils, a pair of generally vertical laterally-disposed receiver coils, and a pair of armatures carried by said beam and extending within said receiver coils and adapted to be pulled thereby so as to exert opposite moments upon said beam, the relative impedance of said transmitter coils being varied upon movement of the float-carried armature thereby to vary the current flowing in the respective receiver coils so as to vary the pull on the respective beam armatures and thus to tilt said beam, and means connected to said beam for varying the rate of counting of said counting means responsive to variations in the rate-of-flow of fluid.

6. In a system for measuring total fluid flow during a predetermined elapsed time period, said system having a rotameter including a vertical metering tube and a metering float adapted for free up-and-down movement responsive to variations in rate-of-flow through said tube, and having an electrical counter; a magnet, a magnetically-operated switch adapted to actuate said counter, means for periodically interrupting the magnetic field of said magnet thereby periodically to operate said switch, and means actuated by said metering float for controlling said interrupting means for varying the rate of interruption of said magnetic field, thereby to vary the total registered by said counter during said elapsed time period.

7. In a system for measuring total fluid flow during a predetermined elapsed time period, said system having a rotameter including a vertical metering tube and a metering float adapted for free up-and-down movement responsive to variations in rate-of-flow through said tube, and having an electrical counter; a magnet, a magnetically-operated switch adapted to actuate said counter, means for periodically interrupting the magnetic field of said magnet thereby periodically to operate said switch, said last-mentioned means including a slotted interruptor wheel rotatably mounted adjacent said switch, and means actuated by said metering float for varying the rate of rotation of said interruptor wheel, thereby to vary the total registered by said counter during said elapsed time period.

8. In a system for measuring total fluid flow during a predetermined elapsed time period, said system having a rotameter including a vertical metering tube and a metering float adapted for free up-and-down movement responsive to variations in rate-of-flow through said tube, and having an electrical counter; a magnet, a magnetically-operated switch adapted to actuate said counter, means for periodically interrupting the magnetic field of said magnet thereby periodically to operate said switch, said last-mentioned means including a slotted interruptor wheel rotatably mounted adjacent said switch, and means for varying the rate of interruption of said magnetic field thereby to vary the total registered by said counter during said elapsed time period, said last-mentioned means including a balanced beam, an electrical impedance circuit for tilting said beam responsive to movement of said metering float, and means actuated by tilting of said beam for varying the rate of rotation of said interruptor wheel.

9. In a system for measuring total fluid flow during a predetermined elapsed time period, said system having a rotameter including a vertical metering tube and a metering float adapted for free up-and-down movement responsive to variations in rate-of-flow through said tube, and having an electrical counter; a magnet, a magnetically-operated switch adapted to actuate said counter, means for periodically interrupting the magnetic field of said magnet thereby periodically to operate said switch, said interrupting means including a slotted interruptor wheel rotatably mounted adjacent said switch, and means for varying the rate of interruption of said magnetic field thereby to vary the total registered by said counter during said elapsed time period, said last-mentioned means including a cam, means for rotating said cam responsive to movement of said metering float and means for varying the rate of rotation of said interruptor wheel responsive to rotation of said cam.

NATHANIEL BREWER.